United States Patent [19]

Schiller et al.

[11] Patent Number: 5,330,057
[45] Date of Patent: Jul. 19, 1994

[54] SCREEN AND SCREEN CLOTH FOR VIBRATORY MACHINE AND METHOD OF MANUFACTURE THEREOF

[75] Inventors: Ronald J. Schiller, Lancaster; John J. Bakula, Grand Island, both of N.Y.

[73] Assignee: Derrick Manufacturing Corporation, Buffalo, N.Y.

[21] Appl. No.: 1,857

[22] Filed: Jan. 8, 1993

[51] Int. Cl.$^5$ ................................. B07B 1/49
[52] U.S. Cl. .......................... 209/392; 209/401; 51/319; 210/499; 428/229
[58] Field of Search ............... 209/254, 262, 379, 391, 209/392, 397, 400, 401, 402, 403; 210/499, 497.01, 510.1; 51/319; 428/229, 338

[56] References Cited

U.S. PATENT DOCUMENTS

| | | | |
|---|---|---|---|
| 3,049,796 | 8/1962 | Pall | 210/510.1 X |
| 3,327,866 | 6/1967 | Pall et al. | 210/499 |
| 3,716,138 | 2/1973 | Lumsden | 209/401 |
| 4,446,022 | 5/1984 | Harry | 210/388 |
| 4,575,421 | 3/1986 | Derrick et al. | 209/397 |

Primary Examiner—D. Glenn Dayoan
Assistant Examiner—Tuan N. Nguyen
Attorney, Agent, or Firm—Joseph P. Gastel

[57] ABSTRACT

A screen assembly for a vibratory screening machine including a frame, and a screen cloth on the frame having wires with a diameter D of between about $1.6 \times 10^3$ micrometers and 17.8 micrometers with a peak to valley roughness R in micrometers which is between about $R = 0.333D$ and $R = 0.05D$. A screen cloth for mounting on the frame having a range of dimensions as set forth above. A method of making a screen for a vibratory screening machine including the steps of providing a screen cloth having a wire of a diameter D of between about $1.6 \times 10^3$ micrometers and 17.8 micrometers and roughing the surface of the wires to a peak to valley roughness which is between about $R = 0.333D$ and $R = 0.05D$.

33 Claims, 2 Drawing Sheets

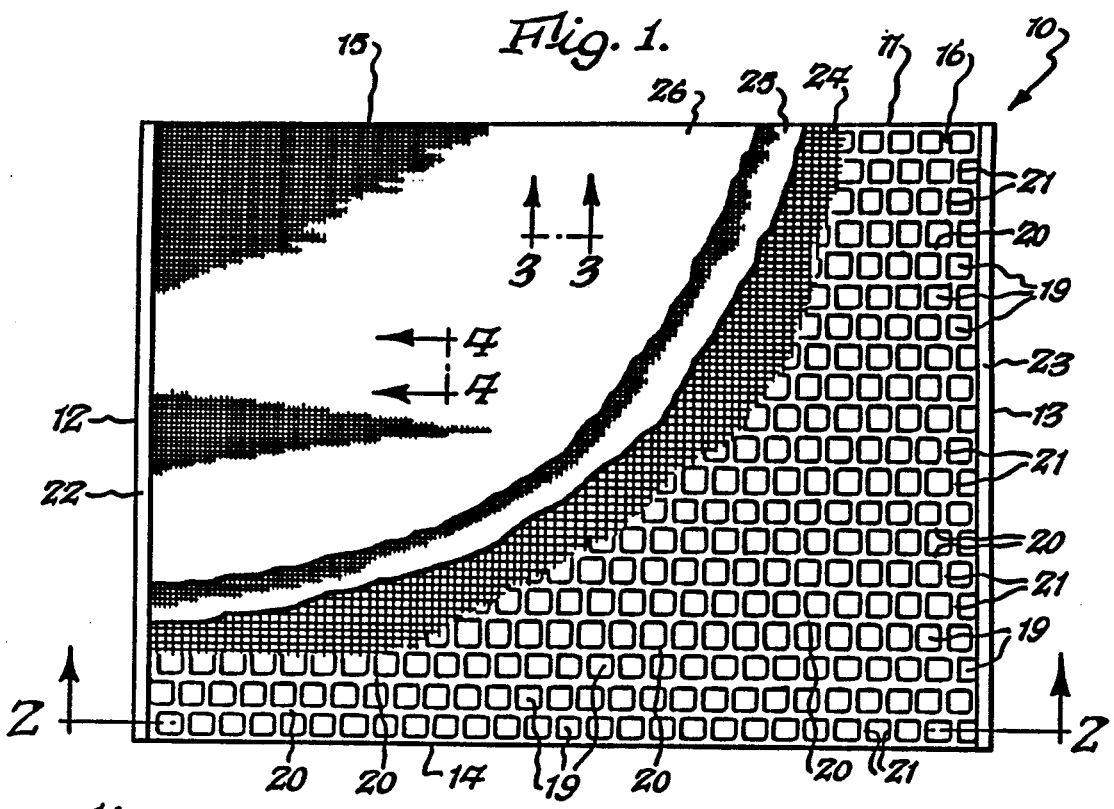
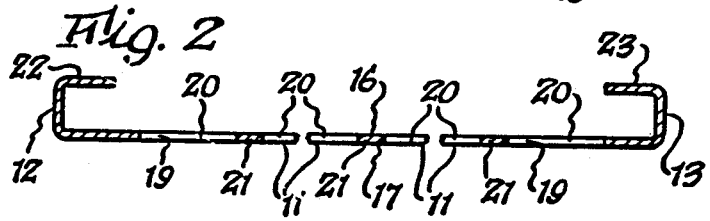
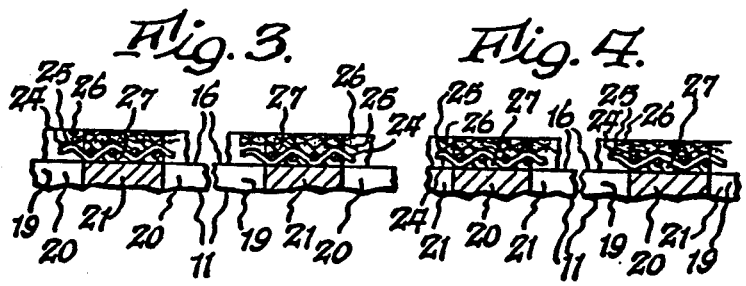
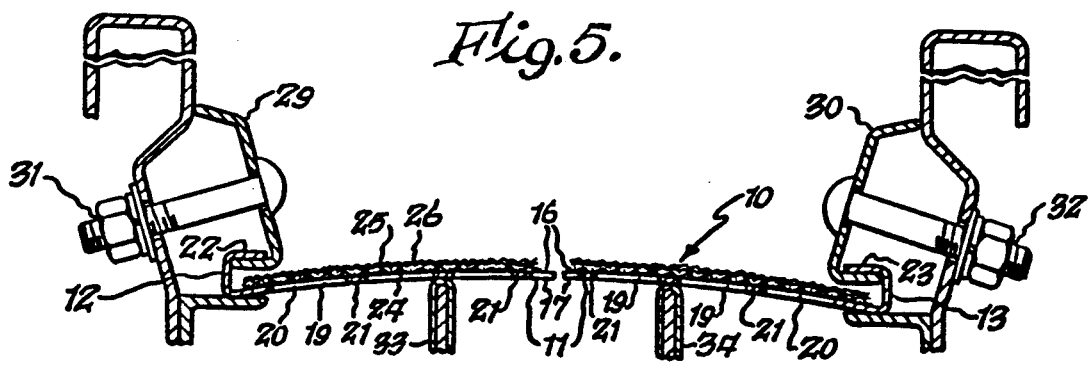

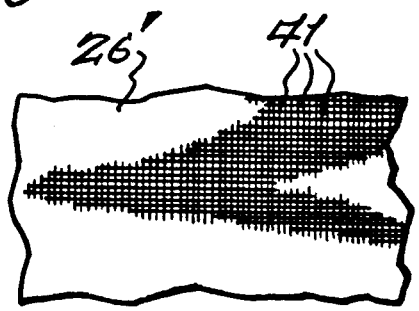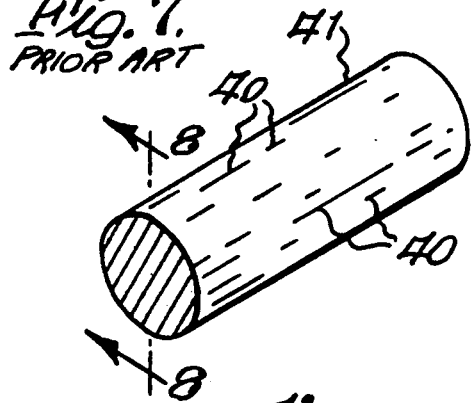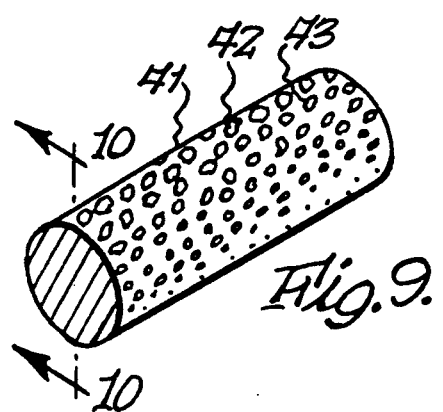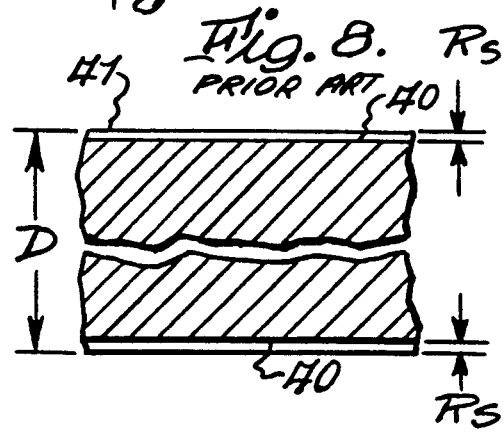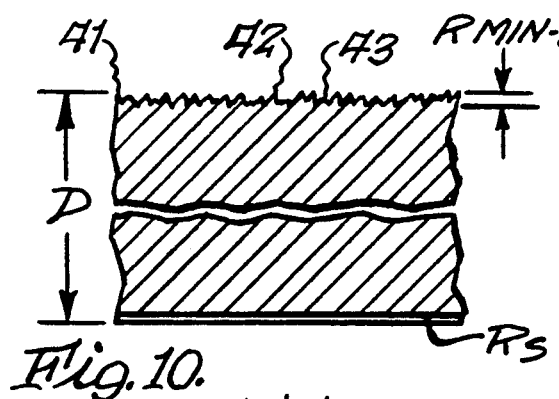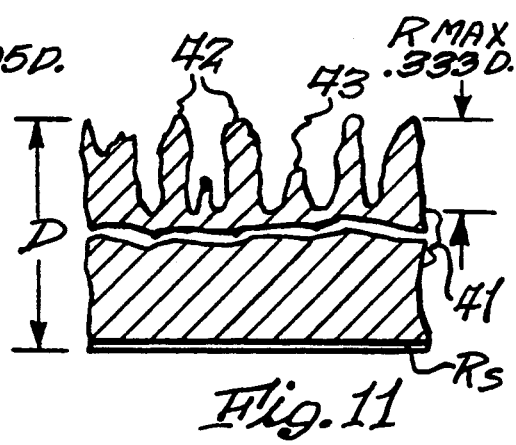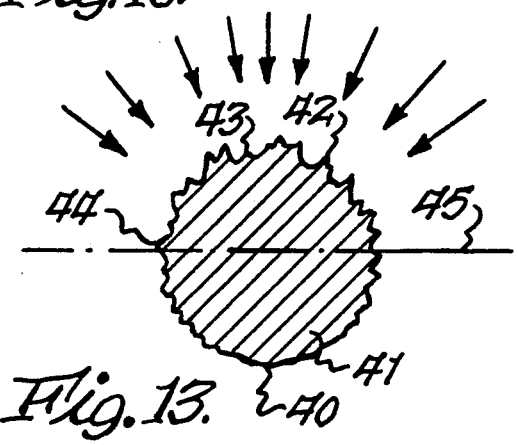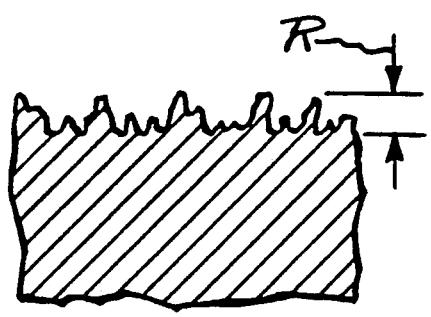

SCREEN AND SCREEN CLOTH FOR VIBRATORY MACHINE AND METHOD OF MANUFACTURE THEREOF

BACKGROUND OF THE INVENTION

The present invention relates to an improved screen cloth and to a screen assembly which are used in a vibrating screening machine, and to a method of fabrication thereof.

By way of background, the vibrating screening machines of the type shown in U.S. Pat. No. 4,882,054 and other types of vibratory screening machines utilize screens of the type shown in U.S. Pat. No. 4,575,421 and also use other types of screens which are mounted in various types of frames.

The performance of a screen in a screening operation is determined by a combination of its "conveyance" and "conductance" under given conditions of vibration. Conveyance is the amount of solids or the feed at which the solids are moved or are being advanced forward on the screen during vibration. This is usually measured in inches per minute. Conductance is a measure of how easily the particles which are being screened pass through the screen. A combination of the conveyance and conductance determines the screen performance, and improved performance is usually accompanied by less blinding, that is, less clogging of the screen.

It has been found that if the wires of the screen which contacts the material being screened are toughened, both the conveyance and conductance of the screen are improved and blinding is lessened so that the screen performs better.

SUMMARY OF THE INVENTION

It is accordingly one object of the present invention to provide an improved screen assembly for a vibrating screening machine which utilizes a toughened screen cloth to improve both the conveyance and conductance and thus improve the screen performance.

Another object of the present invention is to provide an improved screen cloth which can be used in the fabrication of a screen assembly for a vibratory screening machine.

A further object of the present invention is to provide a method of producing a screen assembly having a screen cloth with a toughened surface for a vibratory screening machine so that its conveyance and conductance are both improved and blinding is lessened. Other objects and attendant advantages of the present invention will readily be perceived hereafter.

The present invention relates to a screen assembly for a vibratory screening machine comprising a frame, and a screen cloth on said frame having wires with a diameter D of between about $1.6 \times 10^3$ micrometers and 17.8 micrometers with a peak to valley roughness R which is between about $R=0.333D$ and $R=0.05D$.

The present invention also relates to a screen cloth for a vibratory screening machine having wires with a diameter D of between about $1.6 \times 10^3$ micrometers and 17.8 micrometers with a peak to valley roughness R which is between about $R=0.333D$ and $R=0.05D$.

The present invention also relates to a method of making a screen cloth for a vibratory screening machine comprising the steps of providing a screen having a wire diameter D of between about $1.6 \times 10^3$ micrometers and 17.8 micrometers, and toughening the surface of said wires to a peak to valley roughness which is between about $R=0.333D$ and $R=0.05D$.

The various aspects of the present invention will be more fully understood when the following portions of the specification are read in conjunction with the accompanying drawings wherein:

BRIEF DESCRIPTION OF THE DRAWINGS

FIG. 1 is a plan view of an embodiment of an improved screen assembly of the present invention with portions broken away to show the various layers of the screen;

FIG. 2 is a fragmentary enlarged view taken substantially along line 2—2 of FIG. 1 and showing the plate to which the screens are attached;

FIG. 3 is a greatly enlarged fragmentary cross sectional view taken substantially along line 3—3 of FIG. 1;

FIG. 4 is a greatly enlarged fragmentary cross sectional view taken substantially along line 4—4 of FIG. 1;

FIG. 5 is a fragmentary cross sectional view taken substantially along line 2—2 of FIG. 1 and showing, in addition, portions of the vibrating screening machine which support the screen assembly;

FIG. 6 is a fragmentary plan view of a screen cloth which has been toughened in accordance with the present invention;

FIG. 7 is a greatly enlarged fragmentary perspective view of a wire which is used in a screen such as shown in FIG. 6 or in the upper screen of FIG. 1 as it is manufactured and before it has been toughened in accordance with the teaching of the present invention;

FIG. 8 is a fragmentary schematic cross sectional view taken substantially along line 8—8 of FIG. 7 showing the normal roughness which a wire of the type shown in FIG. 7 has after it has been manufactured in the normal manner by drawing and before it is toughened;

FIG. 9 is a fragmentary perspective view of a wire such as shown in FIG. 7 after it has been toughened from one side in accordance with the present invention;

FIG. 10 is a fragmentary enlarged schematic cross sectional view taken substantially along line 10—10 of FIG. 9 and showing the minimum roughness which a wire of the present invention can have after it has been toughened from one side;

FIG. 11 is an enlarged fragmentary schematic cross sectional view taken substantially along line 10—10 of FIG. 9 and showing the maximum roughness to which a wire of the present invention can have after it has been toughened from one side;

FIG. 12 is a fragmentary schematic view showing how the peak to valley roughness of a wire is measured, regardless of whether this roughness is the maximum or minimum roughness; and FIG. 13 is a schematic view showing one process by which the surface of the wire screens of FIGS. 1 or 6 can be roughened from one side.

DESCRIPTION OF THE PREFERRED EMBODIMENTS

Summarizing briefly in advance, the improved screen assembly of the present invention has a screen cloth with a toughened upper surface which contacts the material to be screened and thus greatly increases the performance of the screen assembly in that it possesses improved conveyance, improved conductance, and less blinding, as these terms have been generally defined above.

An embodiment of the improved screen assembly 10 of the present invention includes a perforated metal plate 11, such as steel or any other suitable metal, having a first pair of opposite edges 12 and 13 and a second pair of opposite edges 14 and 15 and an upper surface 16 and a lower surface 17. Plate 11 includes openings 19 which are bordered by elongated metal strip-like portions 20 which extend from edge 12 to edge 13 and by staggered shorter strip-like portions 21 which extend lengthwise between edges 14 and 15. The openings 19 are formed by a punching operation and are quadrangles of approximately one inch square with rounded corners, but they may be of any other desired shape or size. The dimension of openings 19 should not be less than about one-half inch or greater than about four inches, and more preferably not greater than about two and one-half inches and most preferably not greater than about one inch. Strip-like portions 20 and 21 are approximately 1/10 inches wide, but they may be of any desired width. The length of plate 11 between edges 12 and 13 may be approximately four feet and its width between edges 14 and 15 may be approximately 3⅛ feet and it may have a thickness of about 1/16 of an inch. However, it will be appreciated that the size of plate 11 may vary as required to fit different machines. In a plate 11 which is about four feet in length, there will be about 35 openings 19 in each row between edges 12 and 13 when the openings are one inch square. Thus, the width of each opening is a small fraction of the length of the plate between edges 12 and 13. The same is true of the relationship between the height of openings 19 and the width of the plate between edges 14 and 15. Channel-shaped members 22 and 23 are formed integrally with plate 11 at edges 12 and 13, respectively.

A coarse supporting screen 24 extends substantially entirely across upper surface 16. Screen 24 may be of between about 8 and 75 mesh, or any other suitable mesh. A first fine screening screen 25 extends over the entire coarse screen 24 and is in contiguous abutting relationship therewith. A second fine screening screen 26 extends across the entire upper surface of fine screen 25 and is in contiguous abutting relationship therewith. Coarse screen 24 is basically a support for the portions of screens 25 and 26 which overlie openings 19. Screens 24, 25 and 26 are secured to the elongated border portions 20 and 21 and to each other and by epoxy adhesive 27. However, other suitable adhesives or methods of bonding may be used. Thus, the borders of the portions of screens 24, 25 and 26 overlying each opening 19 are firmly adhesively secured to the border portions formed by elongated strip-like portions 20 and 21. Screening screens 25 and 26 may be between 80 and 400 mesh, and preferably central screen 25 has openings which are approximately 20% larger than the openings of top screen 26 so that any particle passing through screen 26 will pass through screen 25. The border portions 20 and 21 can be seen through the screens when the screen assembly is viewed in plan, as in FIG. 1. However, this has been omitted from the drawings for ease of illustration.

Screen assembly 10 is mounted in a vibrating screening machine by means of elongated channel-shaped draw bars 29 and 30 which engage channels 22 and 23 as shown in FIG. 6 and are drawn up by means of nut and bolt assemblies 31 and 32, respectively, as is well known in the art. Screen assembly 10 rests on a frame (not shown) having a plurality of elongated members 33 and 34 extending parallel to channels 12 and 13 and supported at their opposite ends on the frame member. In its operative position screen assembly 10 is bowed slightly so that its center along a line parallel to edges 12 and 13 is higher than the outer edges 12 and 13, as is well known. Screen assembly 10 may also be inclined downwardly from upper edge 15 to lower edge 14 or it may be horizontal, as is well known. Material to be screened is fed onto screen assembly 10 at edge 15 and passes toward edge 14 as screen assembly 10 is vibrated in the conventional manner. As noted above, border portions 21 are staggered. The reason for this is that since the material to be screened is fed onto screen assembly 10 at edge 15 and moves toward lower edge 14, the staggering will prevent the material being screened from following the border portions 21 without passing over openings 19. The foregoing screen without a toughened uppermost screen is described in U.S. Pat. No. 4,575,421, issued Mar. 11, 1986.

The disclosed screen assembly 10 is by way of example and not of limitation, and the toughened screen cloth 26, which is described in greater detail hereafter, can be used in any suitable frame by itself or in combination with supporting screens. Also, the screen assembly 10 of the present invention can be used for screening dry material, and it can be used on screening machines such as shown in U.S. Pat. No. 4,882,054 for screening wet material, that is a mixture of liquid and particulate matter such as drilling mud or kaolin and water.

In accordance with the present invention, the wires of the uppermost screen 26 are toughened to an extent which is greater than the normal roughness of the wire as originally manufactured. Each wire 41, when originally manufactured, has random longitudinal score marks 40 (FIG. 7) which result from the wire drawing process. Wires of the type under consideration include diameters from 0.063 inches (1.6 ram) to 0.0007 inches (0.0178 ram) The foregoing translate to $1.6 \times 10^3$ micrometers and 17.8 micrometers, respectively. An intermediate range of wire sizes which can be toughened in accordance with the present invention is between about $1.0 \times 10^3$ micrometers and 24 micrometers, and a more restricted range is between about $8 \times 10^2$ micrometers and 50 micrometers. According to manufacturing tolerances, the roughness of a wire as originally manufactured cannot exceed 0.01D where D is the original diameter of the wire. As noted from FIG. 7, the score marks 40 extend longitudinally of wire 39.

In accordance with the present invention, the improved wire 41 which is utilized in screens 26 and 26' is toughened so that the roughness is random rather than in longitudinal score marks and consists of a general random pitting which includes higher projections 42 of various heights and lower projections 43 of various heights. This can be defined as the peak to valley roughness R which is the maximum radial difference between the highest peaks 36 and lowest valleys 38 due to toughening, as a fraction of the diameter D, as shown in FIG. 12.

In accordance with the present invention, it has been determined that the improved conveyance, improved conductance, and less blinding is obtained when the peak to valley roughness R, as defined above, (FIG. 12) falls between 0.05D and 0.333D. Thus, the minimum roughness 0.05D is schematically shown in FIG. 10, and the maximum roughness 0.333D is schematically shown in FIG. 11. At this point it is to be noted that conveyance is defined as the feed of material per unit of time across the screen which is vibrated at a given screen angle and given speed for a given material. It is usually measured in inches per minute. Conductance is a measure of how easily the material which is being screened passes through the screen. In the industry, the combination of conveyance and conductance is a measure of the performance of a screen cloth. The combination of the improved conveyance and conductance results in less blinding, that is, less clogging of the screen, because the material passes over the screen more rapidly because of improved conveyance and passes through the screen better because of improved conductance. In screens which were actually tested, a definite performance gain has been observed resulting from the toughened surface. It has been observed that the screens thus pass more fluid therethrough and move more solid along them and thus perform much more work than unroughened screens. Notwithstanding that more work is performed, the screens have been observed not to wear out as fast because the toughening has increased the abrasion resistance and in addition has relieved the stress in the wires. In other words, when the toughening is by means of blasting with abrasive material, as described in greater detail hereafter, there has been a stress relief which permits the unsupported spans of screen to flex during vibration with less fatigue failure. The use of the toughening is contemplated for screens between 70 mesh having a wire size of 0.003 inches and 460 mesh having a wire size of 0.001 inches, and in fact can also be used with screens of a size up to 30 mesh having a wire size of 0.0065 inches. It is believed that the improved conveyance is due to improved traction which the toughened wires exert on the material which is being screened. In certain conditions, the performance has been increased up to 100%. It is believed that the performance gain is due to the ability of the toughened wires to convey solid particles more surely along the path, rather than to have such particles slip and roll as they are being conveyed during vibration.

Screens made in accordance with the present invention have been toughened by blasting with a noviculite and water mixture. In this respect, noviculite having a particle size of between 325 mesh and 1600 mesh and a concentration of 4.12 pounds of noviculite to 2 quarts of water was utilized to blast screens at a pressure of 50 pounds per square inch. More specifically, the mixture which was used comprised 650 mesh noviculite in a concentration by volume of 29% to 61% of water and it was projected against the screen at a pressure of 50 pounds per square inch. The toughening process can be used on screens which have been fabricated in accordance with FIG. 1, in which event the toughening only need be done on the upper surface of the screen, that is, on screen 26. Alternatively, the toughening can be effected on the screen cloth itself, such as on cloth 26' of FIG. 6. Furthermore, the toughening can be applied to both sides of screen 26' although it need only be applied to the side which contacts the material which is to be screened.

In FIG. 13 there is a schematic representation of the manner in which the toughening is effected by the noviculite and water mixture. In this respect, the wire is represented by numeral 41 and the toughened surface is represented by the portion 44 which contains the projections 42 and 43 of various sizes. As can be seen from FIG. 13, the noviculite is projected from one side of the wire in the direction of the arrows, and it thus produces the toughened surface 44 substantially in the pattern shown because the toughening not only occurs on the upper 180° of the wire but also extends into a part of the lower 180° section below line 45 and the toughening gradually diminishes to zero. In other words, when the toughening is from one side of the wire, as would occur when a screen cloth is toughened from one side, there is an entire range of toughening with the major toughening being above the horizontal line 45, and the amount of toughening gradually diminishing in the lower 180° of the wire to the area of the 0.01D roughness 40 due to the scoring as a result of manufacturing.

While the outside range of peak to valley roughness which is contemplated for producing improved performance has been set forth above as between the minimum roughness 0.05D and the maximum roughness 0.333D, it will be understood that any peak to valley roughness within such outer limits can be utilized to improve performance, and this can vary with the material being screened. A more restricted intermediate range has a peak to valley roughness of between about 0.10D and 0.240D and a still more restricted range of peak to valley roughness can be between 0.14D and 0.20D. However, in situations where only smaller amounts of roughness are desired, that is, if the roughness should not approach 0.333D but should remain closer to the 0.05D value, a lower range can be between 0.05D and 0.24D and a still lower range can be between 0.05D and 0.20D. Additionally, if desired, the range can be up from a value slightly higher than 0.05D, for example 0.08D, and thus the outer range can be between 0.08D and 0.24D, a lower range can be between 0.08D and 0.20D and a still lower range can be between 0.08D and 0.14D. In short, since there are very many variables involved in screening, any desired amount of roughness in excess of the normal roughness of about 0.01D due to manufacturing can be used if it gives the desired results of improving conveyance.

In addition to the wet blasting process described above utilizing noviculite and water, it is contemplated that other abrasive materials in liquid or in air can be used to roughen the surface including normal sandblasting procedures utilizing the proper sizes of abrasive. In addition, it is contemplated that the surfaces can be toughened by etching, acid washing, and plating, or the screen or the wires themselves which are utilized to make the screen can be toughened in any suitable manner within the parameters described above. It is also contemplated that the toughened screens can be utilized in any type of screening arrangements including just plain screens in a frame, double-layer screens in a frame, screens such as shown in FIG. 1, and screens such as shown in FIG. 1 having a triple layer of screening screens thereon in addition to the coarse support screen.

Examples of screen assemblies which have been tested are as follows:

EXAMPLE 1

A screen was fabricated in accordance with the structure described above relative to FIG. 1 wherein the metal plate had the dimensions discussed above and wherein screen 24 was of 32 mesh, screen 25 was of 180 mesh, and screen 26 was of 200×150 mesh slotted cloth. Screen 26 had a wire size of 0.0012 inches ($3.08 \times 10^{-5}$ micrometers). After the screen was assembled, the surface of screen 26 was toughened by subjecting it to a wet blast of a mixture of noviculite and water at a pressure of 50 pounds per square inch for a period of one minute and 30 seconds. The noviculite and water mixture contained by volume 29% of noviculite and 61% of water, and the noviculite has a size of 650 mesh U.S. The roughness of the surfaces of the wires of screen 26 definitely fell between 0.050 and 0.333 of the diameter of the wires. The screen was tested on a vibratory screening machine and it was observed that material was conveyed at a rate of 81 inches per minute. This material was a slurry of drilling mud comprising water, Bentonite clay and sand wherein the particle size of the material which was being put through the screen was no greater than 200 mesh and which contained particles up to a size of 70 mesh. The same material was screened on a screen which was identical in all respects to the above-described screen except that screen 26 was not toughened, that is, its roughness was within the tolerance of the wire which was produced in the normal manner, that is, the roughness did not exceed 0.01 of the diameter. The conveyance of the unroughened screen was 46.2 inches per minute.

EXAMPLE 2

A screen was fabricated in accordance with the structure described above relative to FIG. 1 wherein the metal plate had the dimensions discussed above and wherein screen 24 was of 32 mesh, screen 25 was of 120 mesh, and screen 26 was of 145 mesh. Screen 26 had a wire size of 0.0019 inches (50 micrometers). After the screen was assembled, the surface of screen 26 was toughened by subjecting it to a wet blast of a mixture of noviculite and water at a pressure of 50 pounds per square inch for a period of 1 minute, 30 seconds. The noviculite and water mixture contained by volume 29% of noviculite and 61% of water, and the noviculite has a size of 650 mesh U.S. The roughness of the surfaces of the wires of screen 26 definitely fell between 0.050 and 0.333 of the diameter of the wires. The screen was tested on a vibratory screening machine and it was observed that material was conveyed at a rate of 90 inches per minute. This material was a slurry of drilling mud comprising water, Bentonite clay and sand wherein the particle size of the material which was being put through the screen was no greater than 145 mesh and which contained particles up to a size of 50 mesh. The same material was screened on a screen which was identical in all respects to the above-described screen except that screen 26 was not toughened, that is, its roughness was within the tolerance of the wire which was produced in the normal manner, that is, the roughness did not exceed 0.01 of the diameter. The conveyance of the unroughened screen was 57.8 inches per minute.

While preferred embodiments of the present invention have been disclosed, it will be appreciated that it is not limited thereto but may be otherwise embodied within the scope of the following claims.

What is claimed is:

1. A screen assembly for a vibratory screening machine comprising a frame, and a screen cloth on said frame having wires with a diameter D of between about $1.6 \times 10^3$ micrometers and 17.8 micrometers and having a peak to valley roughness R of between about $R=0.05D$ and $R=0.333D$.

2. A screen assembly for a vibratory screening machine as set forth in claim 1 wherein said peak to valley roughness R is between about $R=0.10D$ and $R=0.240D$.

3. A screen assembly for a vibratory screening machine as set forth in claim 1 wherein sad peak to valley roughness R is between about $R=0.14D$ and $R=0.20D$.

4. A screen assembly for a vibratory screening machine as set forth in claim 1 wherein said diameter D of said wire is between about $1.0 \times 10^3$ micrometers and 24 micrometers.

5. A screen assembly for a vibratory screening machine as set forth in claim 4 wherein said peak to valley roughness R is between about $R=0.120D$ and $R=0.05D$.

6. A screen assembly for a vibratory screening machine as set forth in claim 4 wherein said peak to valley roughness R is between about $R=0.10D$ and $R=0.07D$.

7. A screen assembly for a vibratory screening machine as set forth in claim 1 wherein said diameter D is between about $8 \times 10^2$ micrometers and 50 micrometers.

8. A screen assembly for a vibratory screening machine as set forth in claim 7 wherein said peak to valley roughness R is between about $R=0.120D$ and $R=0.05D$.

9. A screen assembly for a vibratory screening machine as set forth in claim 7 wherein said peak to valley roughness R is between about $R=0.10D$ and $R=0.07D$.

10. A screen assembly for a vibratory screening machine as set forth in claim 1 wherein said frame comprises an apertured plate, and wherein said screen cloth is bonded to said plate.

11. A screen assembly for a vibratory screening machine as set forth in claim 10 wherein said peak to valley roughness R is between about $R=0.120D$ and $R=0.05D$.

12. A screen assembly for a vibratory screening machine as set forth in claim 10 wherein said peak to valley roughness R is between about $R=0.10D$ and $R=0.07D$.

13. A screen assembly for a vibratory screening machine as set forth in claim 10 wherein said diameter D of said wire is between about $1.0 \times 10^3$ micrometers and 24 micrometers.

14. A screen assembly for a vibratory screening machine as set forth in claim 13 wherein said peak to valley roughness R is between about $R=0.120D$ and $R=0.05D$.

15. A screen assembly for a vibratory screening machine as set forth in claim 13 wherein said peak to valley roughness R is between about $R=0.10D$ and $R=0.07D$.

16. A screen assembly for a vibratory screening machine as set forth in claim 10 wherein said diameter D is between about $8 \times 10^2$ micrometers and 50 micrometers.

17. A screen assembly for a vibratory screening machine as set forth in claim 16 wherein said peak to valley roughness R is between about $R=0.120D$ and $R=0.05D$.

18. A screen assembly for a vibratory screening machine as set forth in claim 16 wherein said peak to valley roughness R is between about $R=0.10D$ and $R=0.07D$.

19. A screen assembly for a vibratory screening machine having wires with a diameter D of between about $1.6 \times 10^3$ micrometers and 17.8 micrometers and each having a peak to valley roughness R of between about $R=0.1666D$ and $R=0.025D$.

20. A screen for a vibratory screening machine as set forth in claim 19 wherein said peak to valley roughness R is between about $R=0.120D$ and $R=0.05D$.

21. A screen for a vibratory screening machine as set forth in claim 19 wherein said peak to valley roughness R is between about $R=0.10D$ and $R=0.07D$.

22. A screen assembly for a vibratory screening machine as set forth in claim 19 wherein said diameter D of said wire is between about $1.0 \times 10^3$ micrometers and 24 micrometers.

23. A screen assembly for a vibratory screening machine as set forth in claim 22 wherein said peak to valley roughness R is between about $R=0.120D$ and $R=0.05D$.

24. A screen for a vibratory screening machine as set forth in claim 22 wherein said peak to valley roughness R is between about $R=0.10D$ and $R=0.07D$.

25. A screen for a vibratory screening machine as set forth in claim 19 wherein said diameter D is between about $8 \times 10^2$ micrometers and 50 micrometers.

26. A screen for a vibratory screening machine as set forth in claim 25 wherein said peak to valley roughness R is between about $R=0.120D$ and $R=0.05D$.

27. A screen for a vibratory screening machine as set forth in claim 25 wherein said peak to valley roughness R is between about $R=0.10D$ and $R=0.07D$.

28. A screen cloth for a vibratory screening machine comprising wires having a diameter D of between about $1.6 \times 10^3$ micrometers and 17.8 micrometers with a peak to valley roughness R of between about $R=0.333D$ and $R=0.05D$.

29. A screen cloth for a vibratory screening machine as set forth in claim 28 wherein said range peak to valley roughness R is between about $R=0.10D$ and $R=0.240D$, 30. A screen cloth for a vibratory screening machine as set forth in claim 28 wherein said peak to valley roughness R is between about $R=0.14D$ and $R=0.20D$, 31. A screen cloth for a vibratory screening machine as set forth in claim 28 wherein said diameter D of said wire is between about $1.0 \times 10^3$ micrometers and 24 micrometers, 32. A screen cloth for a vibratory screening machine as set forth in claim 31 wherein said peak to valley roughness R is between about $R=0.120D$ and $R=0.05D$.

33. A screen cloth for a vibratory screening machine as set forth in claim 31 wherein said peak to valley roughness R is between about $R=0.10D$ and $R=0.07D$.

* * * * *

UNITED STATES PATENT AND TRADEMARK OFFICE
CERTIFICATE OF CORRECTION

PATENT NO. : 5,330,057

DATED : July 19, 1994

INVENTOR(S) : Ronald J. Schiller et al

Page 1 of 2

It is certified that error appears in the above-indentified patent and that said Letters Patent is hereby corrected as shown below:

```
Column 4, line 22, change "toughened" to --roughened--;
         line 32, change "toughened" to --roughened--;
         line 38, change "ram" to --mm--;
         line 39, change "ram" to --mm--;
         line 41, change "toughened" to --roughened--;
         line 52, change "toughened" to --roughened--;
         line 58-59, change "toughening" to --roughening--.

Column 5, line 15, change "toughened" to --roughened--;
         line 21, change "toughening" to --roughening--;
         line 23, change "toughening" to --roughening--;
         line 28, change "toughening" to --roughening--
         line 34, change "toughened" to --roughened--;
         line 37, change "toughened" to --roughened--;
         line 42, change "toughened" to --roughened--;
         line 51, change "toughening" to --roughening--;
         line 53, change "toughening" to --roughening--;
         line 55, change "toughening" to --roughening--;
         line 57, change "toughening" to --roughening--;
         line 62, change "toughening" to --roughening--;
         line 64, change "toughened" to --roughened--.

Column 6, line 1, change "toughened" to --roughened--;
         line 2, change "toughening" to --roughening--;
         line 4, change "toughening" to --roughening--;
         line 6, change "toughening" to --roughening--;
         line 7, change "toughened" to --roughened--
         line 8, change "toughening" to --roughening--;
         line 8-9, change "toughening" to --roughening--;
         line 10, change "toughening" to --roughening--;
         line 45, change "toughened" to --roughened--;
         line 47, change "toughened" to --roughened--;
```

UNITED STATES PATENT AND TRADEMARK OFFICE
CERTIFICATE OF CORRECTION

PATENT NO. : 5,330,057

DATED : July 19, 1994

INVENTOR(S) : Ronald J. Schiller et al

It is certified that error appears in the above-indentified patent and that said Letters Patent is hereby corrected as shown below:

```
Column 6, line 49, change  "toughened" to --roughened--.

Column 7, line 16, change "toughened" to --roughened--;
         line 30, change "toughened" to --roughened--;
         line 47-48, change "toughened" to --roughened--.
```

Signed and Sealed this

Twenty-seventh Day of September, 1994

BRUCE LEHMAN

Attest:

Attesting Officer

Commissioner of Patents and Trademarks